Feb. 20, 1951     J. O. DUNCAN     2,542,643
TRAILER HITCH
Filed Sept. 6, 1947     2 Sheets-Sheet 1
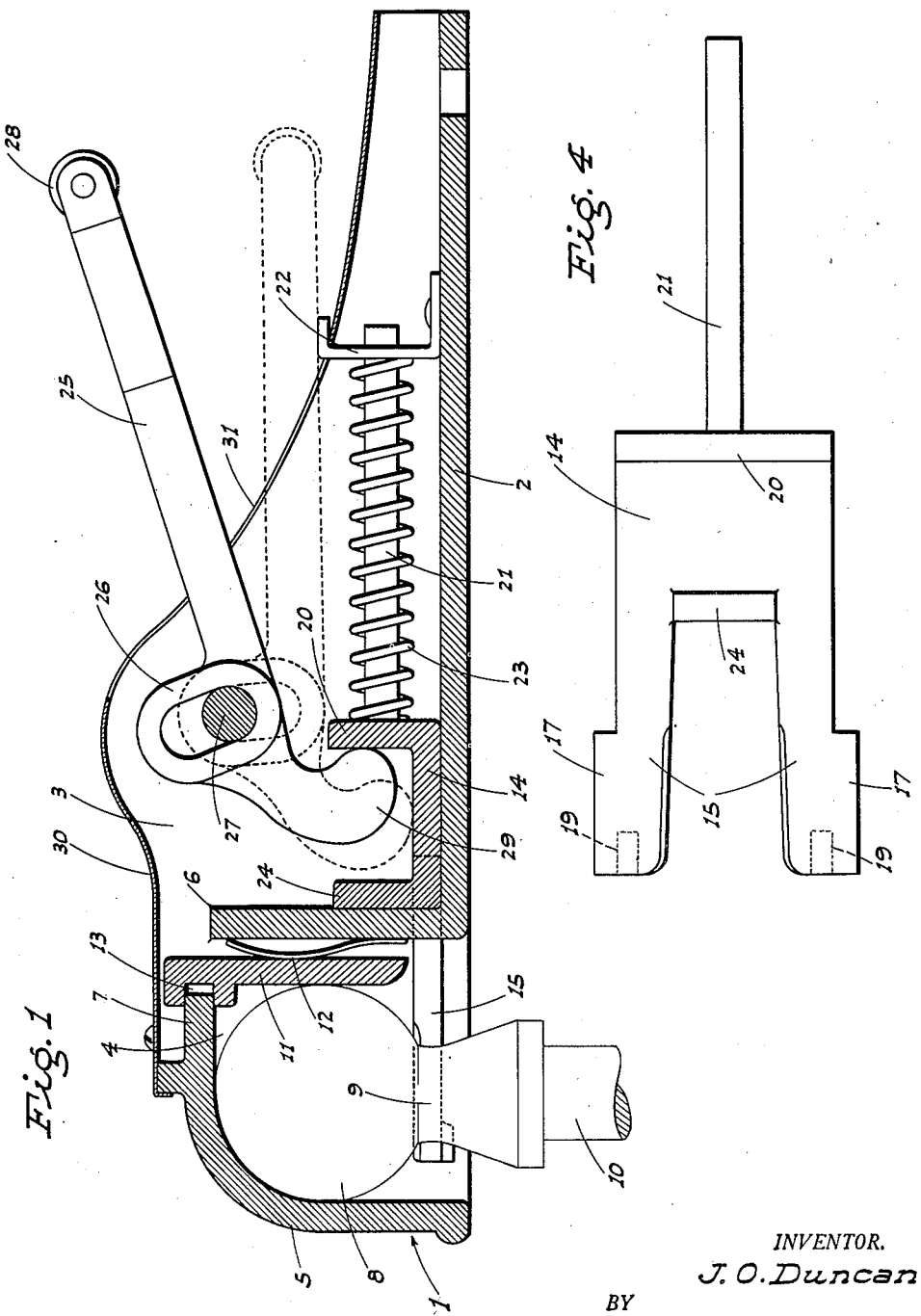
INVENTOR.
J. O. Duncan
BY
ATTYS

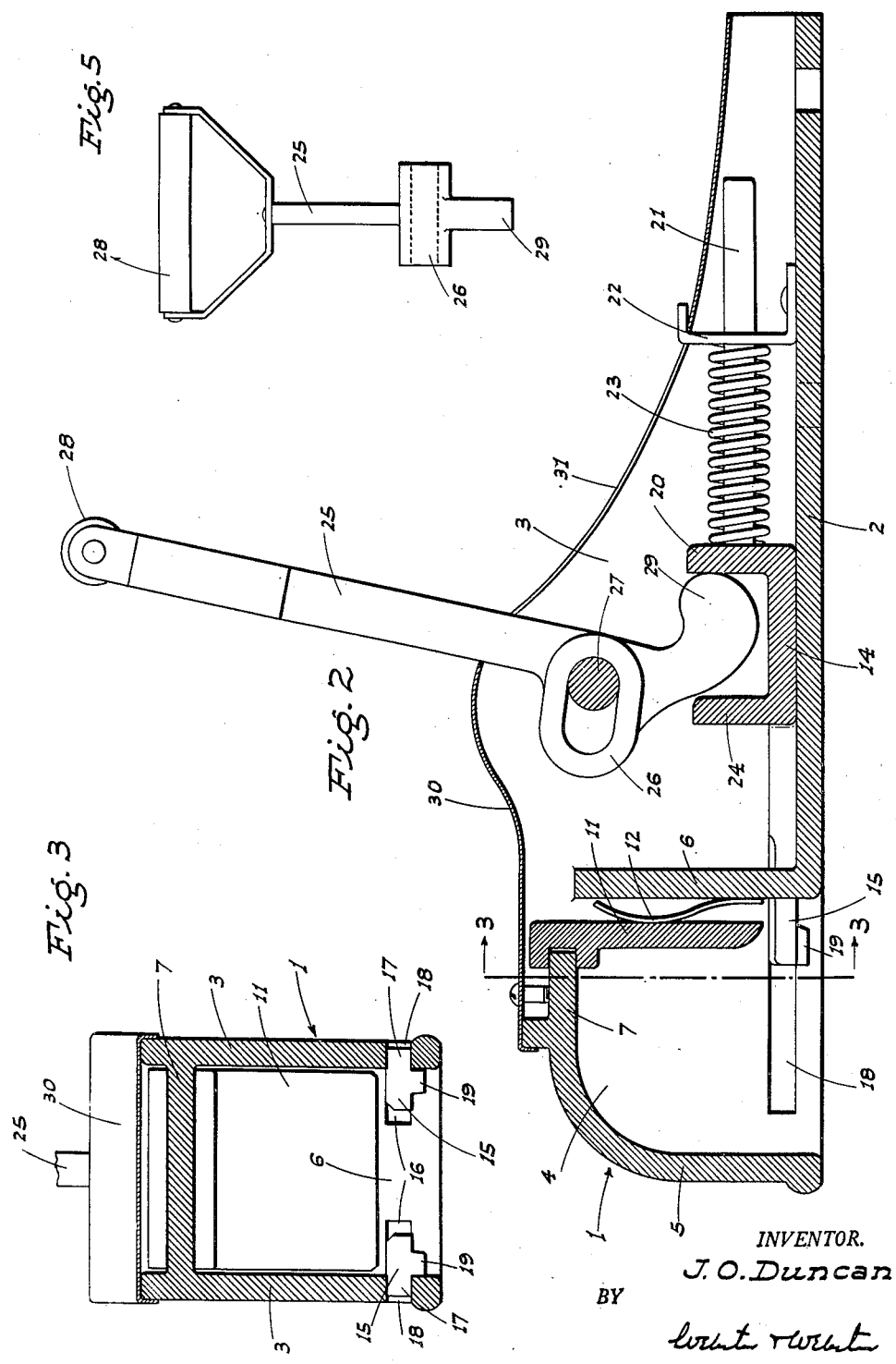

Patented Feb. 20, 1951

2,542,643

UNITED STATES PATENT OFFICE 2,542,643

TRAILER HITCH

John O. Duncan, Fresno, Calif.

Application September 6, 1947, Serial No. 772,492

2 Claims. (Cl. 280—33.17)

This invention relates to, and it is an object to provide, a novel hitch for coupling a trailer to a motor vehicle.

Another object of the present invention is to provide a trailer hitch in which the ball and socket thereof are quick-detachable, or coupled, by grasping and raising or lowering and releasing, respectively, a handle arranged with the trailer tongue-supported socket, which handle also serves as a means to manipulate said tongue when the hitch is uncoupled.

A further object of this invention is to provide a novel, spring-urged mechanism for releasably locking the ball in the socket against accidental separation.

An additional object of the invention is to provide a trailer hitch, as in the preceding paragraph, in which said mechanism includes a slidably mounted, spring-urged fork adapted to straddle the neck of the ball to thereby normally prevent retraction of the ball from the socket.

An additional object of this invention is to provide a tractor hitch which includes a novel spring-pressed wear-plate arrangement in the socket, operative to prevent loose-play of the ball in the socket when the hitch is coupled and in use.

A further object of the invention is to provide a practical, convenient, and rugged trailer hitch, and one which will be exceedingly effective for the purpose for which it is designed.

These objects are accomplished by means of such structure and relative arrangement of parts as will fully appear by a perusal of the following specification and claims.

In the drawings:

Fig. 1 is a longitudinal sectional elevation of the hitch with the parts in engagement as for use; the normal position of the release lever being shown in dotted lines, and its partially raised position being shown in full lines.

Fig. 2 is a longitudinal sectional elevation of the hitch with the lever in hitch-release position, and with the socket free of the ball.

Fig. 3 is a cross section on line 3—3 of Fig. 2.

Fig. 4 is a plan view of the locking fork, detached.

Fig. 5 is an elevation of the release lever, detached.

Referring now more particularly to the characters of reference on the drawings, the hitch comprises an elongated body, indicated generally at 1, which body includes a longitudinal bottom plate 2; upstanding side walls 3, integral therewith; and a downwardly opening socket 4 formed at the forward end of said body.

The socket 4 includes a front wall 5; a back wall 6; and a top wall 7; the rear edge of the top wall 7 terminating short of the upper edge of the back wall 6, for the purpose hereinafter described.

A ball 8 is adapted to engage in the socket 4 from below; and said ball includes a reduced-diameter neck 9; the ball being carried on an attachment stem 10 adapted to be secured to a motor vehicle at the rear. The body 1 secures to the tongue of a trailer with the socket 4 exposed for engagement over the ball 8.

Within the socket 4, and in front of the back wall 6, the socket includes a spring-pressed wear plate 11 urged forwardly by a leaf spring 12; such motion of the wear plate 11 being guided by the provision of a transversely, forwardly opening channel 13 at the top of said wear plate straddling the rear edge portion of the top wall 7. Thus, the wear plate 11 can move a limited distance in the socket, and, being spring-urged, maintains the ball 8 against loose-play in said socket when the hitch is in use.

The ball 8 is normally quick-detachably secured against escape from the socket 4 by means of the following mechanism:

A generally flat locking fork 14 rests in part on the bottom plate 2 rearwardly of the back wall 6, with the fork legs 15 projecting forwardly through slots 16 in said back wall whereby the fork may be projected into the lower portion of the socket 4 in straddling relation to the reduced-diameter neck 9 directly below the ball 8, which locks the latter in place. Such motion of the fork 14 is guided by lateral guide lugs 17 which run in longitudinal guide slots 18 in the side walls 3. There are also dependent guide lugs 19 on the legs 15 which bear against the sidewalls 3 from the inside, as clearly shown in Fig. 3.

It will thus be seen that when the locking fork 14 is advanced, the ball 8 cannot escape the socket, and such fork is normally maintained in said advanced position as follows:

A transverse cleat 20 upstands from the rear end of the locking fork 14, and a plunger rod 21 is fixed to such cleat and projects rearwardly in slidable relation through an upstanding bracket 22 fixed on the bottom plate 2; there being a heavy-duty, loaded compression spring 23 surrounding the rod 21 between the cleat 20 and bracket 22. With this arrangement, the spring 23 normally acts to advance the locking fork; such advance motion being limited by an upstanding stop 24 on the fork adapted to abut the back wall 6 when the fork legs 15 are in ball securing position.

A release lever 25 extends lengthwise of the device, being formed—intermediate its ends—with a transverse bearing sleeve 26 having a bore through which a cross pin 27 extends in loose-play relation; said lever extending, in its normal position, mainly rearwardly from the cross pin 27. At its normally rear end the release lever 25 includes a transverse handle 28, while at the opposite end the lever includes a rounded foot 29 positioned to engage the cleat 20 from the front thereof.

To disengage or uncouple the hitch, it is only necessary to grasp the handle 28 and lift upwardly in a direction tending to raise the tongue of the trailer. This lifting motion results, automatically, in uncoupling of the hitch, for the reason that the handle moves from its dotted-line position of Fig. 1 to the full-line position of Fig. 2. When this occurs, the foot 29 moves rearwardly, shifting the cleat 20 and the fork 14 in a rearward direction to release the ball 8, whereupon the socket 4 escapes the latter. Thereafter, with the socket 4 clear of the ball the handle 28 may be used to manipulate the trailer tongue to any desired point, and to then lower said tongue into ground engagement.

To couple the hitch the procedure is merely reversed. The handle 28 is raised, the socket 4 is engaged over the ball 8, and then said handle is merely released from the hand; the loaded spring 23 then urging the fork 14 forwardly, automatically, to engage below the ball 8 to lock it in said socket.

In short, uncoupling of the hitch is accomplished solely by raising of the handle 28, while coupling of the hitch is attained by releasing said handle, when in its raised position, and with the ball and socket engaged.

The cross pin 27 has the loose-play relation in the transverse bearing sleeve 26 so that the release lever 25 may occupy a very low normal position lengthwise of the device, and yet act as above described.

The body 1 is fitted, from the socket to its rear end, with a protective hood 30 slotted lengthwise, as at 31, to permit of the necessary motion of the release lever 25.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A trailer hitch comprising an elongated body which includes a bottom plate, upstanding side walls and a downwardly opening socket at its forward end, such socket including a front wall and a back wall, the latter upstanding from the bottom plate of the body, a ball adapted to engage in the socket and having a reduced diameter neck, a locking fork slidably mounted on the bottom plate of the body, the prongs of the fork projecting through the back wall of the socket for engagement under the ball and straddling about said neck, an upstanding stop on the fork engageable with the back wall of the socket to limit the movement of the fork, yieldable means normally holding the stop against said back wall of the socket, a transverse upstanding cleat on the fork spaced rearwardly from the stop, a lever fulcrumed on the body, and a projecting foot on the lever normally projecting free between the stop and cleat and engageable with the cleat upon operation of the lever to move the fork against the resistance of the said yieldable means.

2. A trailer hitch comprising an elongated body which includes a bottom plate, upstanding side walls and a downwardly opening socket at its forward end, such socket including a front wall, a rear wall and a top wall extending from the front wall and terminating short of the rear wall, a ball adapted to engage in the socket and having a reduced diameter neck, a locking fork slidably mounted on the bottom plate of the body, the prongs of the fork projecting through the rear wall of the socket for engagement under the ball and straddling about said neck, an upstanding stop on the fork engageable with the rear wall of the socket to limit the movement of the fork, yieldable means normally holding the stop against said rear wall of the socket, manually operated means mounted on the body and operative to shift the fork out of engagement with the ball, a wear plate in substantial parallelism with the rear wall and having a channel slidably straddling the free edge of the top wall, and yieldable means between the rear wall and the wear plate.

JOHN O. DUNCAN.

REFERENCES CITED

The following references are of record in the file of this patent:

UNITED STATES PATENTS

| Number | Name | Date |
| --- | --- | --- |
| 1,450,665 | Crozier | Apr. 3, 1923 |
| 1,636,295 | Dempsey | July 19, 1927 |
| 2,078,851 | Hovey | Apr. 27, 1937 |
| 2,130,100 | Rasmussen | Sept. 13, 1938 |

FOREIGN PATENTS

| Number | Country | Date |
| --- | --- | --- |
| 459,394 | Great Britain | Jan. 7, 1937 |
| 816,286 | France | Aug. 4, 1937 |